(12) United States Patent
Yoshizuka et al.

(10) Patent No.: US 10,984,285 B2
(45) Date of Patent: Apr. 20, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Masanori Yoshizuka, Kanagawa (JP); Shigeru Okada, Kanagawa (JP); Shusaku Kubo, Kanagawa (JP); Shintaro Adachi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 55 days.

(21) Appl. No.: 16/538,792

(22) Filed: Aug. 12, 2019

(65) Prior Publication Data

US 2020/0265265 A1 Aug. 20, 2020

(30) Foreign Application Priority Data

Feb. 15, 2019 (JP) .............................. JP2019-025186

(51) Int. Cl.
*G06K 9/62* (2006.01)
*G06K 9/03* (2006.01)

(52) U.S. Cl.
CPC .............. *G06K 9/6255* (2013.01); *G06K 9/03* (2013.01); *G06K 9/6201* (2013.01); *G06K 2209/01* (2013.01)

(58) Field of Classification Search
CPC ....... G06K 9/6255; G06K 9/03; G06K 9/6201
See application file for complete search history.

(56) References Cited

U.S. PATENT DOCUMENTS

2017/0010802 A1\* 1/2017 Xia ..................... G06F 3/04883
2017/0262722 A1\* 9/2017 Nanaumi ............... G06K 9/344

FOREIGN PATENT DOCUMENTS

JP 2011-107966 6/2011

\* cited by examiner

*Primary Examiner* — Edward Park
(74) *Attorney, Agent, or Firm* — JCIPRNET

(57) ABSTRACT

An information processing apparatus includes a recognition unit, a memory, a registration unit, and an extraction unit. The recognition unit performs recognition of one or more characters included in an image and outputs character information indicating the one or more characters. The memory stores a first specific character and a second specific character in association with each other. The first specific character has an index taking on a value lower than a predetermined value. The index indicates accuracy of the recognition performed by the recognition unit. The second specific character is output after the recognition unit performs the recognition of the first specific character. The registration unit registers at least one character or at least one character string as an extraction target. The registration unit registers a first character or a first character string as an extraction target and a second character or a second character string as an extraction target if an operator performs an operation for registering the first character or the first character string as the extraction target and if the first character or the first character string includes the first specific character. The second character or the second character string is composed by replacing the first specific character in the first character or the first character string with the second specific character. The extraction unit extracts at least one character or at least one character string from the character information. The extraction unit extracts the first character or the first character string and the second character or the second character string that are registered as the respective extraction targets.

19 Claims, 13 Drawing Sheets

FIG. 11

```
            OCR RESULT

請求書B (INVOICE B)
口座番号 (ACCOUNT NUMBER) : 222-3333
請求番号 (CHARGE NUMBER) : 12345
```

FIG. 13
| FALSELY RECOGNIZED CHARACTER | CORRECT CHARACTER |
|---|---|
| 水 (WATER) | 求 (DESIRE) |
FIG. 14A
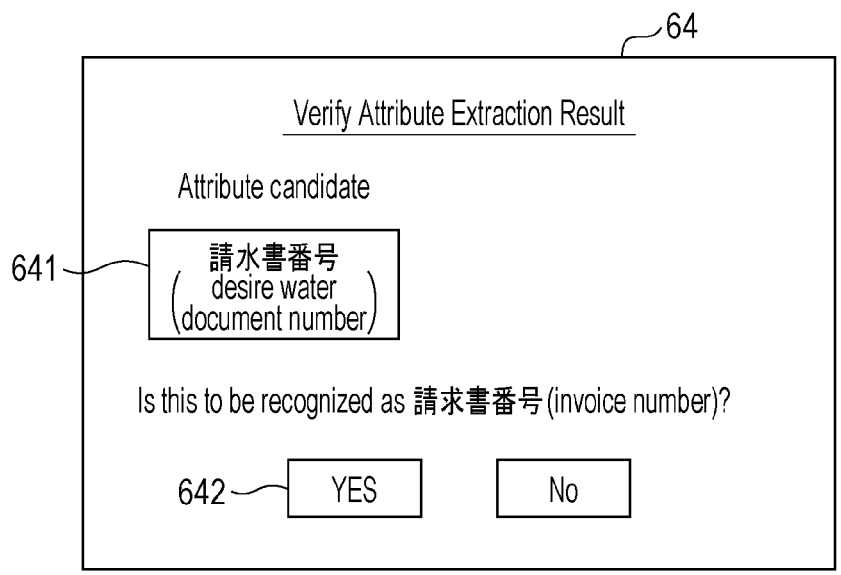
FIG. 14B
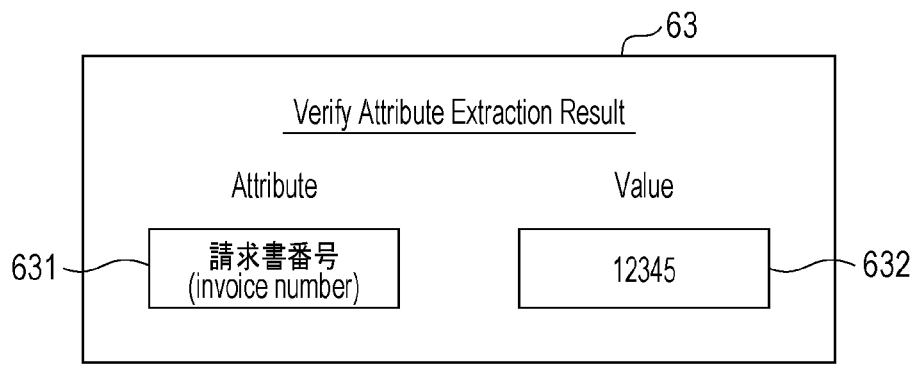

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-025186 filed Feb. 15, 2019.

BACKGROUND

(i) Technical Field

The present disclosure relates to an information processing apparatus and a non-transitory computer readable medium.

(ii) Related Art

In recent years, a document processing apparatus that automatically generates a dictionary for replacement to be performed for correcting a character string falsely recognized in optical character recognition (OCR) to a correct character string (for example, see Japanese Unexamined Patent Application Publication No. 2011-107966).

The document processing apparatus described in Japanese Unexamined Patent Application Publication No. 2011-107966 includes a matching part, an analyzing part, and a filtering part. The matching part performs comparisons on the basis of a correct character string and a post-OCR character string. The correct character string is separated from sample electronic document data imaged from a business document. The post-OCR character string is separated from post-OCR sample document data obtained as a result of OCR performed on the sample electronic document data. The matching part then determines whether false recognition is performed. The analyzing part separates the correct character string into words on a predetermined word basis and registers, as a false recognition pattern candidate, a word included in the separated words and including a character determined as a falsely recognized character by the matching part. The filtering part performs filtering. In the filtering, a word that perfectly or in truncation matches a word in Japanese dictionary data or business word dictionary data is deleted from the false recognition pattern candidates. In the Japanese dictionary data, Japanese words stored in a memory device have been registered. In the business word dictionary data, words used for business are registered. The filtering part stores one or more false recognition pattern candidates left after the filtering as one or more false recognition patterns in the memory device.

SUMMARY

Aspects of non-limiting embodiments of the present disclosure relate to an information processing apparatus and a non-transitory computer readable medium that are enabled to extract a designated character or character string even if a character likely to be recognized falsely by a character recognition function is included in the character or character string.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a recognition unit, a memory, a registration unit, and an extraction unit. The recognition unit performs recognition of one or more characters included in an image and outputs character information indicating the one or more characters. The memory stores a first specific character and a second specific character in association with each other. The first specific character has an index taking on a value lower than a predetermined value. The index indicates accuracy of the recognition performed by the recognition unit. The second specific character is output after the recognition unit performs the recognition of the first specific character. The registration unit registers at least one character or at least one character string as an extraction target. The registration unit registers a first character or a first character string as an extraction target and a second character or a second character string as an extraction target if an operator performs an operation for registering the first character or the first character string as the extraction target and if the first character or the first character string includes the first specific character. The second character or the second character string is composed by replacing the first specific character in the first character or the first character string with the second specific character. The extraction unit extracts at least one character or at least one character string from the character information. The extraction unit extracts the first character or the first character string and the second character or the second character string that are registered as the respective extraction targets.

BRIEF DESCRIPTION OF THE DRAWINGS

Exemplary embodiments of the present disclosure will be described in detail based on the following figures, wherein:

FIG. 11 is a view illustrating an example of character string extraction;

FIG. 13 is a table illustrating an example false-recognition-candidate dictionary information;

FIGS. 14A and 14B are views of example screens, the views respectively illustrating an example candidate screen and an example verification screen;

DETAILED DESCRIPTION

Figure 1:
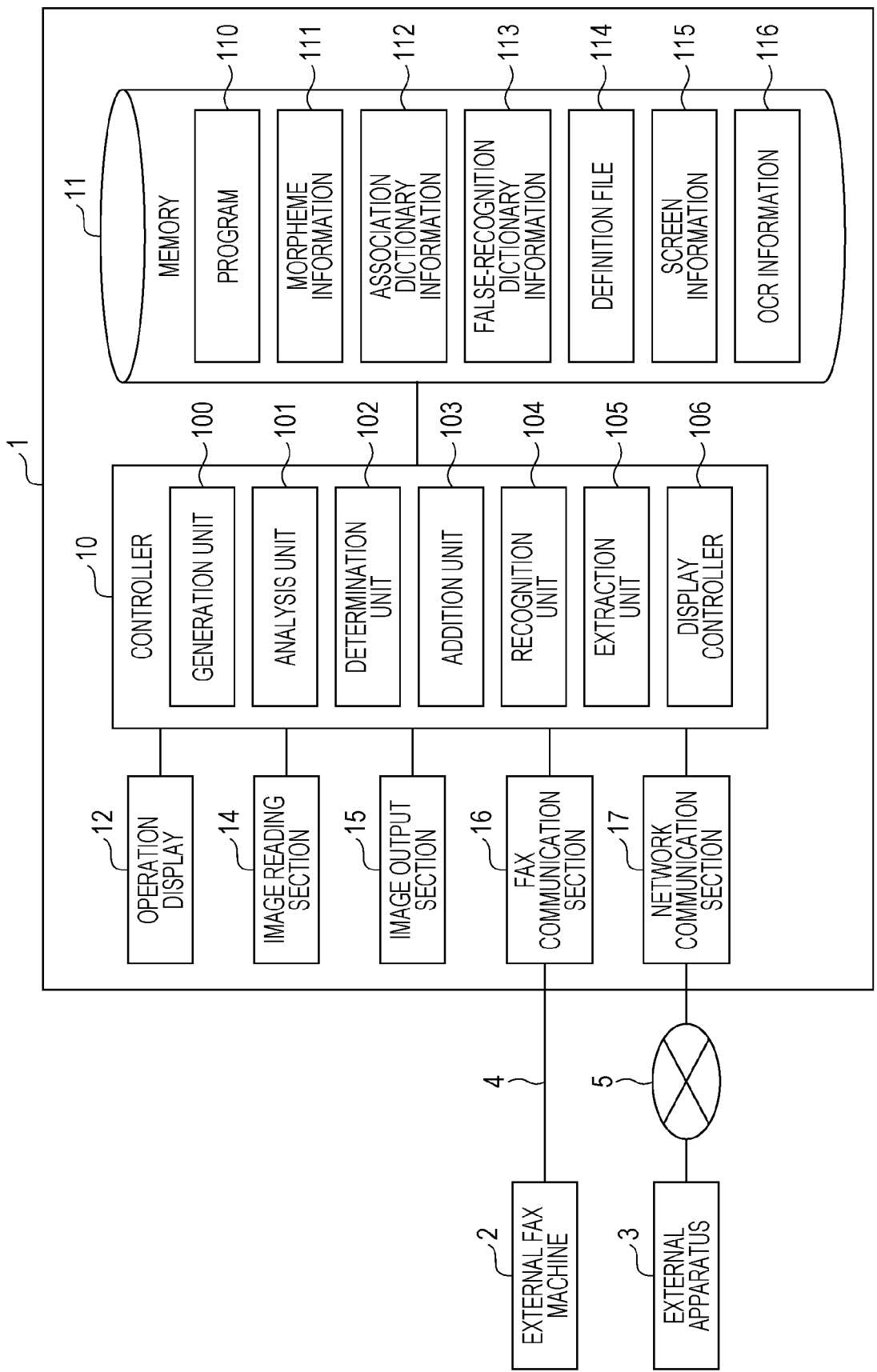
FIG. 1 is a block diagram illustrating an example control system of an information processing apparatus according to a first exemplary embodiment of the present disclosure.

Hereinafter, exemplary embodiments of the present disclosure will be described with reference to the drawings. In the drawings, components having substantially the same functions are denoted by the same reference numerals, and repeated explanation is not provided.

First Exemplary Embodiment

Configuration of Information Processing Apparatus

FIG. 1 is a block diagram illustrating an example control system of an information processing apparatus according to a first exemplary embodiment of the present disclosure. Examples of an information processing apparatus 1 as above include a personal computer, an image forming apparatus, a tablet terminal, and a multifunctional mobile phone (smartphone). Hereinafter, a multifunction printer having multiple functions such as a scanning function, a printing function, a copying function, a faxing function, and an e-mailing function is described as an example of the information processing apparatus 1; however, the information processing apparatus 1 is not limited to the multifunction printer.

The information processing apparatus 1 includes a controller 10 that controls components of the information processing apparatus 1, a memory 11 that stores various data items therein, an operation display 12 used for inputting and displaying information, an image reading section 14 that reads a document image from an original document, an image output section 15 that outputs and prints an image, a fax communication section 16 that faxes to and from an external fax machine 2 through a public communication network 4, and a network communication section 17 that communicates with an external apparatus 3 through a network 5. The memory 11 is an example of a memory.

The controller 10 includes a central processing unit (CPU), an interface, and other components. The CPU is operated in accordance with a program 110 stored in the memory 11 and thereby functions as a generation unit 100, an analysis unit 101, a determination unit 102, an addition unit 103, a recognition unit 104, an extraction unit 105, a display controller 106, and other units. The generation unit 100 and the addition unit 103 are each an example of a registration unit. The units 100 to 106 will be described later in detail.

The memory 11 includes a read only memory (ROM), a random access memory (RAM), a hard disk, and other components and stores therein various data items such as the program 110, morpheme information 111, association dictionary information 112, false-recognition dictionary information 113, a definition file 114 (see FIG. 3), screen information 115 (see FIG. 4), and OCR information 116. The various data items 111 to 116 will be described later in detail.

The operation display 12 is, for example, a touch panel display and has a configuration in which a touch panel is disposed on a display such as a liquid crystal display by using polymerization.

The image reading section 14 reads a document image from an original document. The image reading section 14 includes an automatic document feeder (not illustrated) installed on the platen glass (not illustrated) and a scanner (not illustrated) and optically reads a document image from an original document placed on the platen glass or fed by the automatic document feeder.

The image output section 15 outputs and prints a color image or monochrome image on the recording medium such as a paper sheet through, for example, an electrophotographic system or an inkjet system.

The fax communication section 16 modulates and demodulates data in accordance with a fax protocol such as G3 or G4 and performs fax communications via the public communication network 4.

The network communication section 17 is implemented by a network interface card (NIC) or the like and transmits and receives signals to and from the external apparatus 3 via the network 5. Examples of the external apparatus 3 include a personal computer and a server.

Examples of the network 5 include a local area network (LAN), a wide area network (WAN), the Internet, and an intranet, and the network 5 may be a wired or wireless network.

Details of Various Data Items

The details of the various data items stored in the memory 11 will be described. The morpheme information 111 is information regarding a part of speech or the like of a word used for analyzing a morpheme in a character or character string.

The association dictionary information 112 is information in which expression fluctuation patterns are recorded. The term "expression fluctuation" denotes a difference without substantial meaning change. In the association dictionary information 112, expression fluctuation, for example, in the following patterns is recorded.

Pattern 1: Presence or absence of a prefix of a noun (such as お, ご, and 御 in (each of which is is used in polite expression))

Pattern 2: Presence or absence of a Japanese character added to a Chinese character or a difference of the Japanese character (such as 見積, 見積もり, or 見積り each of which means estimation)

Pattern 3: Presence or absence of the particle の representing the possessive case in Japanese Pattern 4: Presence or absence of a predetermined word (for example, 請求 (charge) relative to 請求書 (invoice)) and the like.

Hereinafter, a character or character string having the same meaning as a reference character or character string but expressed differently from the reference character or character string is also referred to as "a character or character string derived from a reference character or character string and having expression fluctuation".

Figure 2:
FIG. 2 is a table illustrating example false-recognition dictionary information.

FIG. 2 is a table illustrating an example of the false-recognition dictionary information 113. The false-recognition dictionary information 113 is a table having a list of characters likely to be falsely recognized as characters different from the actual characters in an image having undergone an OCR process by the recognition unit 104 to be described later. Specifically, the false-recognition dictionary information 113 stores a character recognized with low accuracy in the OCR process in association with a character output as a false result. The term "character recognized with low accuracy" denotes, for example, a character having an index for the recognition accuracy in the OCR process (hereinafter, referred to as a recognition accuracy index) that is lower than a predetermined value.

The term "recognition accuracy index" denotes the degree of whether a character is correctly recognized in the OCR process. Examples of the index include the proportion of the number of times a character is correctly recognized (in other words, a recognition success rate) in the OCR process executed multiple times to the number of times the OCR process is executed and a proportion indicating a possibility that a character output after executing the OCR process on a specific character is the specific character (in other words, a recognition probability). The proportion is provided in accordance with, for example, a rate of matching between the recognized character and a character stored in the OCR information 116.

As illustrated in FIG. 2, the false-recognition dictionary information 113 has a Falsely recognized character column and a Correct character column. In the Falsely recognized character column, a character output as a false result in the OCR process, that is, a character different from the character actually described in the image (hereinafter, also referred to as a falsely recognized character) is recorded. In the Correct character column, the character actually described in the image (hereinafter, also referred to as a correct character) is recorded. The correct character is an example of a first specific character. The falsely recognized character is an example of a second specific character.

The falsely recognized character applies to, for example, a character having the same radical (such as a left part of a Chinese character, a right part, an upper part, and a frame part) as that of a correct character associated with the character and having a similar shape. Examples of the falsely recognized character include 晴 (fine) associated with 請 (request) that is a correct character, 責 (blame) associated with 積 (add) that is a correct character, and 救 (save) associated with 求 (desire) that is a correct character.

Figure 3:
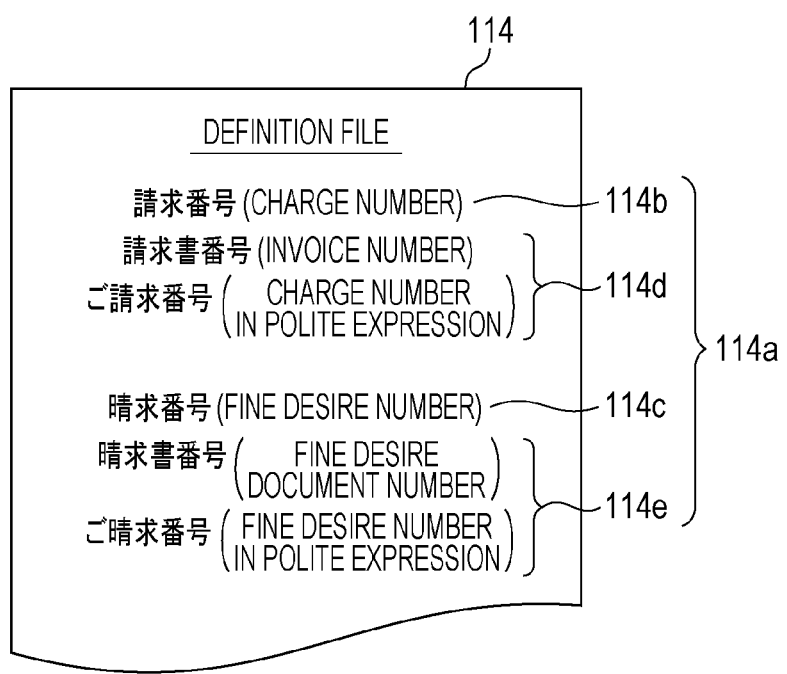
FIG. 3 is a view illustrating an example definition file.

FIG. 3 is a view illustrating an example of the definition file 114. The definition file 114 is a file including a list of characters or character strings to be searched for (hereinafter, also referred to as keys) 114a.

As illustrated in FIG. 3, the keys 114a include a character or character string (hereinafter, also simply referred to as a first key) 114b recorded in accordance with an operation by an operator (hereinafter, also simply referred to as a user), a character or character string (hereinafter, also referred to as a second key) 114c that is newly composed in such a manner that if the first key 114b includes a correct character recorded in the false-recognition dictionary information 113, the correct character in the first key 114b is replaced with the associated falsely recognized character, a character or character string (hereinafter, also referred to as a third key) 114d derived from the first key 114b and having expression fluctuation, and a character or character string (hereinafter, also referred to as a fourth key) 114e that is newly composed in such a manner that if the third key 114d includes the correct character in the false-recognition dictionary information 113, the correct character in the third key 114d is replaced with the associated falsely recognized character.

Note that the fourth key 114e may be a character or character string derived from the second key 114c and having expression fluctuation.

Each key 114a is an example of an extraction target. The first key 114b is an example of a first character or a first character string. The second key 114c is an example of a second character or a second character string. The third key 114d is an example of a third character or a third character string. The fourth key 114e is an example of a fourth character or a fourth character string.

Figure 4A:
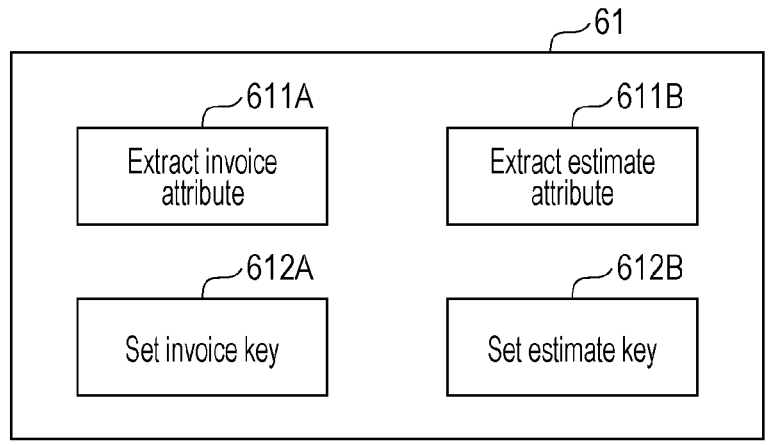
FIGS. 4A, 4B, and 4C are views of example screens, the views respectively illustrating an example selection screen, an example setting screen, and an example verification screen.
Figure 4B:
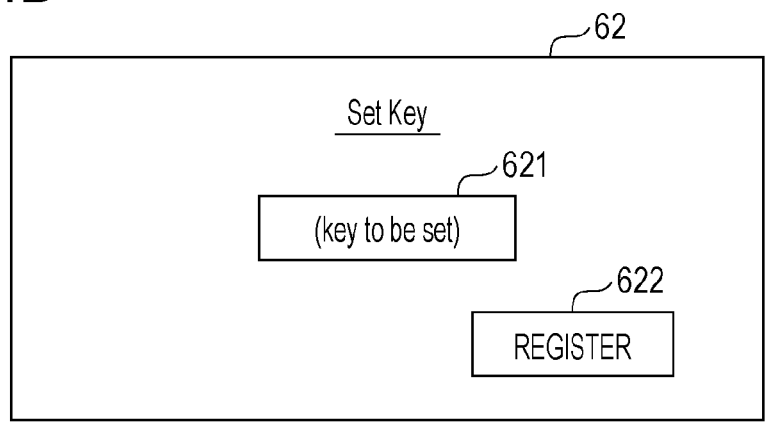
Figure 4C:
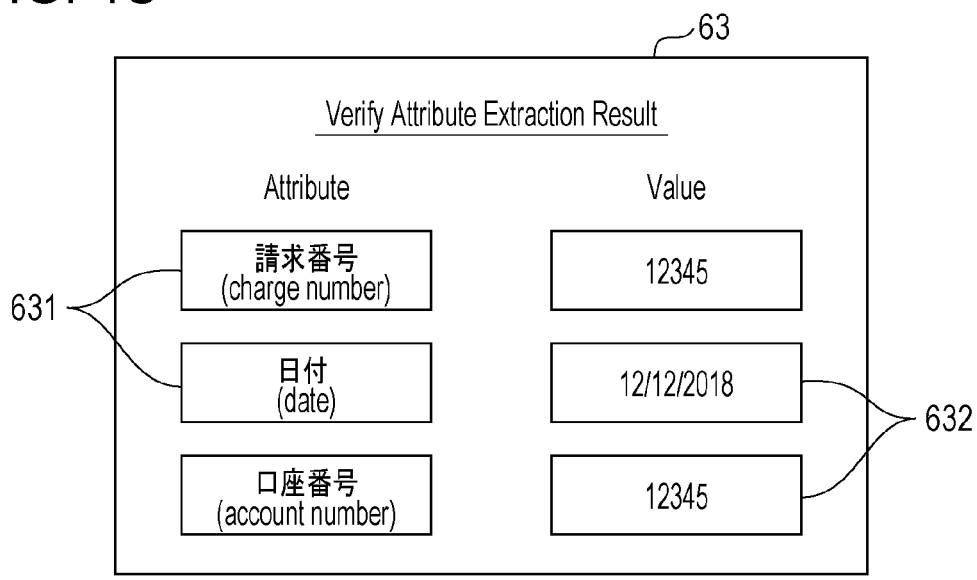

The screen information 115 is information regarding various screens displayed in the display area (not illustrated) of the operation display 12 by the display controller 106 to be described later. The screen information 115 will be described with reference to FIGS. 4A, 4B, and 4C. FIGS. 4A, 4B, and 4C are views illustrating example screens, that is, respectively illustrating an example selection screen, an example setting screen, and an example verification screen.

A selection screen 61 is a screen for the user to select a function to be used. As illustrated in FIG. 4A, selection screen 61 includes a first button 611A that starts an invoice attribute extraction function to extract an attribute of an invoice, a second button 611B that starts an estimate attribute extraction function to extract an attribute of an estimate sheet, a third button 612A that starts an invoice key setting function to set the key 114a to be searched for in the invoice, and a fourth button 612B that starts an estimate key setting function to set the key 114a to be searched for in the estimate sheet. Hereinafter, when one of the first to fourth buttons is referred to without being discriminated from each other, the button is also referred to as an operation button.

The invoice and the estimate sheet are each an example of a document to be read. Note that the document is not limited to the invoice or the estimate sheet. Examples of the document include, an application form, a contract, a specification sheet, and a slip each of which includes a character, a pattern, an image, or the like or includes combination of any of these. The document is an example of an original document.

A setting screen 62 is a screen for the user to set and register the first key 114b described above. As illustrated in FIG. 4B, the setting screen 62 includes a setting button 621 for setting the key 114a and a registration button 622 for registering the key 114a. The term "register" denotes recording the key 114a in the definition file 114 in the memory 11.

A verification screen 63 is a screen to display a character or character string extracted from the image and a value associated with the extracted character or character string. On the verification screen 63 as illustrated in FIG. 4C, attribute fields 631 and value fields 632 are each arranged in a corresponding one of columns. Each attribute field 631 indicates the content of the extracted character or character string (that is, an attribute), and each value field 632 indicates a value associated with the attribute.

The OCR information 116 is information having character patterns as a dictionary. The OCR information 116 is used for the OCR process by the recognition unit 104.

Configuration of Units of Controller 10

The units of the controller 10 will be described in detail. In accordance with a user operation for setting and registering the first key 114b, the generation unit 100 generates the definition file 114 having the first key 114b recorded therein.

The analysis unit 101 performs analysis of one or more morphemes of each key 114a recorded in the definition file 114 (hereinafter, also simply referred to as a morphological analysis) with reference to the morpheme information 111 and outputs the result of the analysis.

The determination unit 102 compares the result output by the analysis unit 101 with the false-recognition dictionary information 113 recorded in the memory 11 and determines whether the key 114a includes a character recorded as Correct character in the false-recognition dictionary information 113.

The addition unit 103 adds a character or character string to the definition file 114 in accordance with a predetermined rule. Specifically, if a key 114a recorded in the definition file 114 includes a character recorded as Correct character in the false-recognition dictionary information 113, the addition unit 103 further additionally records, in the definition file 114, a new character or character string (that is, the second key 114c) composed by replacing the included character with a character recorded as an associated falsely recognized character.

In addition, the addition unit 103 refers to the association dictionary information 112 and further additionally records, in the definition file 114, a character or character string derived from the key 114a recorded in the definition file 114 and having expression fluctuation (that is, the third key 114d and the fourth key 114e).

The recognition unit 104 recognizes one or more characters included in the image captured by the information processing apparatus 1 and outputs character information indicating the one or more characters. The image may be captured, for example, in such a manner that an original document is read by the image reading section 14 or read in advance by an external apparatus (for example, a scanner).

A character is recognized, for example, in the OCR process. Character information includes information (text information) indicating the content or the meaning of the recognized character, information (for example, coordinate value) indicating the location of the character in the image, and the like.

With reference to the definition file 114, the extraction unit 105 searches the character information output by the recognition unit 104 for each key 114a recorded in the definition file 114 and extracts the key 114a from the character information. The extraction unit 105 also searches the character information for a value associated with the extracted key 114a (hereinafter, also referred to as a value) and extracts the value from the character information.

The display controller 106 performs control to display various pieces of information, such as the screen information 115, in the display area of the operation display 12.

Operation of First Exemplary Embodiment

An example of the operations of the information processing apparatus 1 according to the first exemplary embodiment will be described. The description will be provided below separately regarding (1) Document captured as image, (2) Operation for setting and registering definition file 114, and (3) Operation related to process (hereinafter, also referred to as a key-value process) for extracting character or character string designated from read image obtained by reading document (hereinafter, also simply referred to as a document image).

(1) Document Captured as Image

Figure 5:
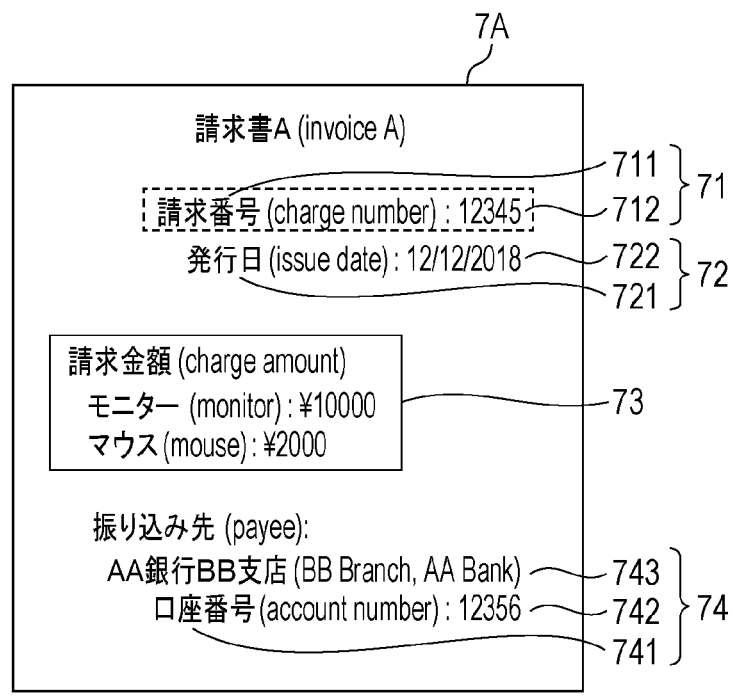
FIG. 5 is a view illustrating an example invoice.

FIG. 5 is a view illustrating an example invoice. In the following description, a first invoice 7A includes, for example, first information 71 indicating a charge number, second information 72 indicating an issue date when the first invoice 7A is issued, third information 73 indicating a charge amount, and fourth information 74 indicating a payee, as illustrated in FIG. 5.

The first information 71 includes a character string 711 describing 請求番号 (charge number) and charge number information 712 indicating a charge number. The second information 72 includes a character string 721 describing 発行日 (issue date) and issue date information 722 indicating an issue date. The fourth information 74 includes a character string 741 describing 口座番号 (account number) and account number information 742 indicating an account number, and payee information 743 indicating the name of a financial institution or the like as a payee. Each of the character strings 711, 721, and 741 associated with numerical information such as the charge number, the issue date, and the account number is an example of an attribute. The numbers and the payee are each an example of a value.

(2) Operation for Setting and Registering Definition File 114

Figure 6:
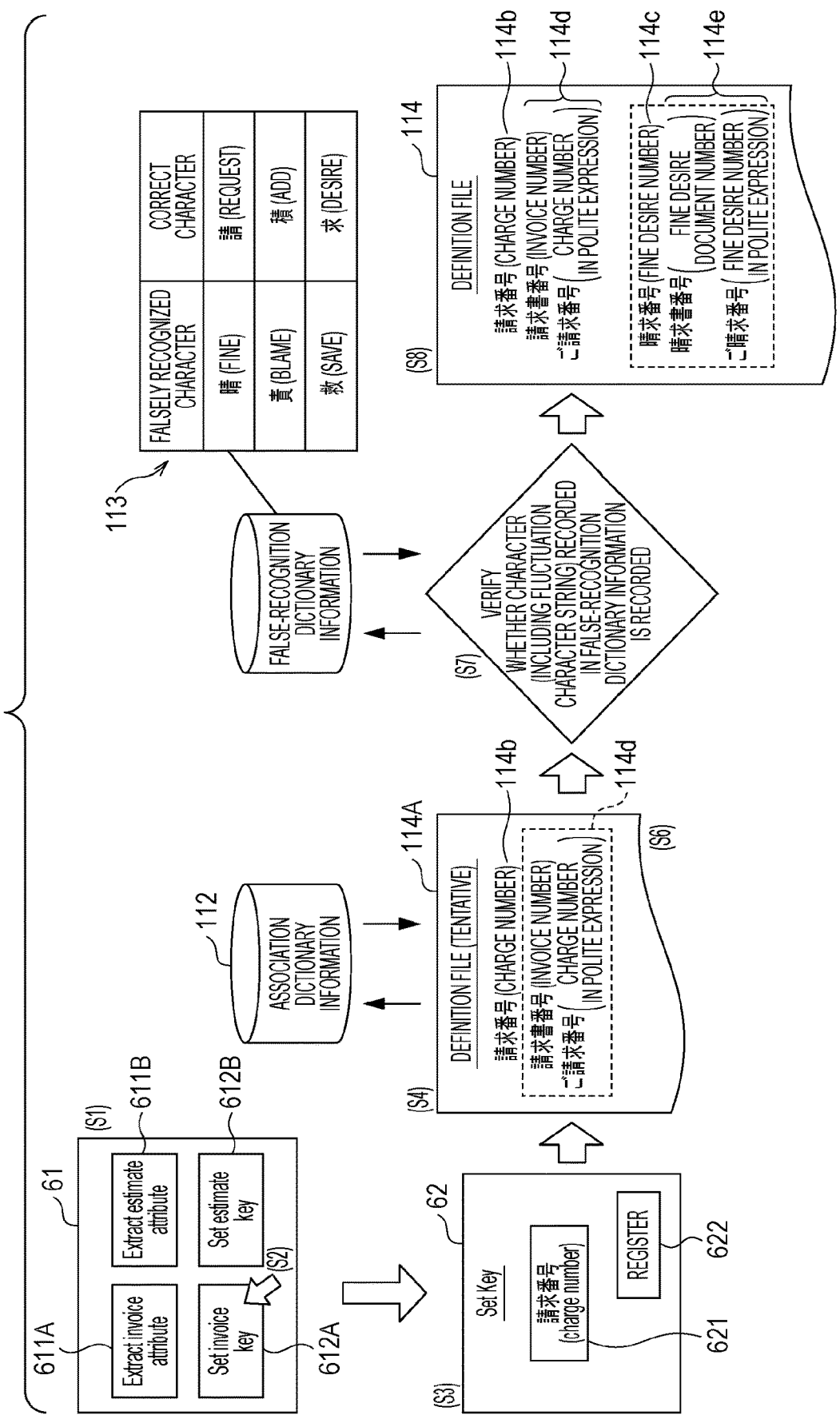
FIG. 6 is a view schematically illustrating an example of the operations of the information processing apparatus illustrated in FIG. 1.
Figure 7:
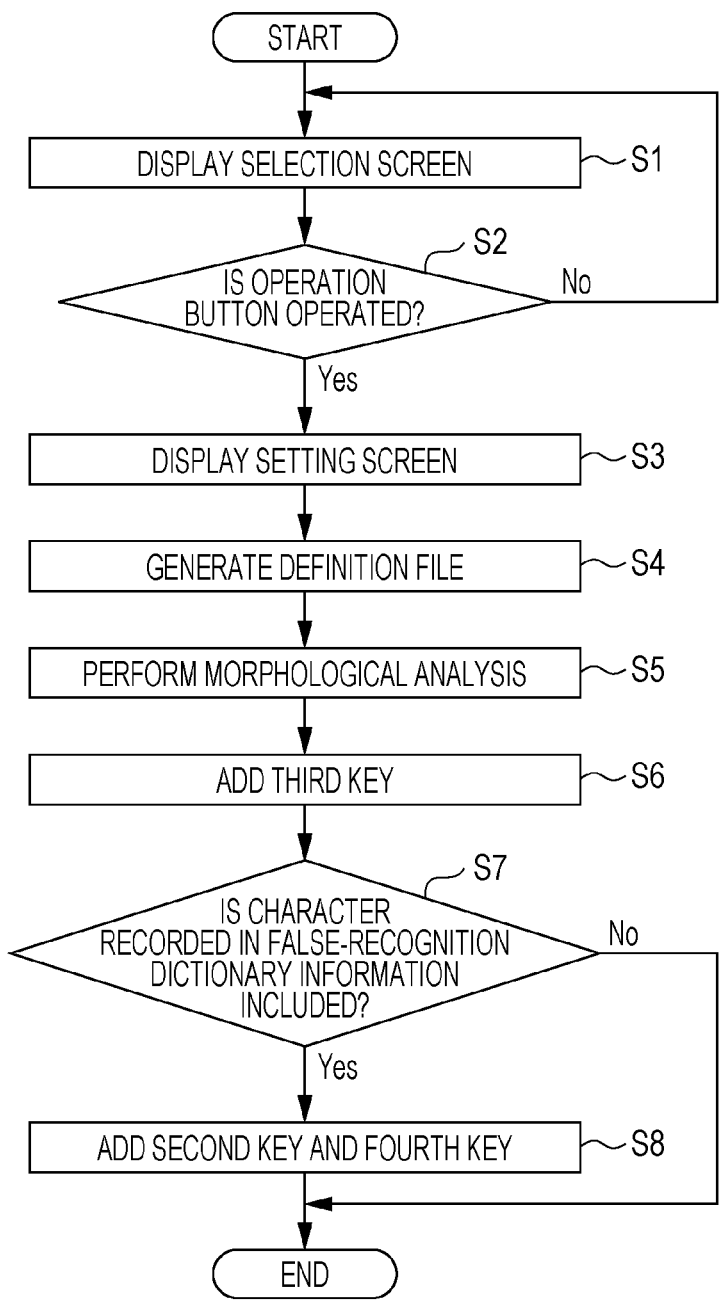
FIG. 7 is a flowchart illustrating an example of the operations of the information processing apparatus illustrated in FIG. 1.

The operation for setting and registering the definition file 114 will be described with reference to FIGS. 6 and 7. FIG. 6 is a view schematically illustrating an example of the operations of the information processing apparatus 1 illustrated in FIG. 1. FIG. 7 is a flowchart illustrating an example of the operations of the information processing apparatus 1 illustrated in FIG. 1. As illustrated in FIGS. 6 and 7, the display controller 106 first performs control to display the selection screen 61 (see FIG. 4A) in the display area of the operation display 12 (S1).

If the user operates the operation button on the selection screen 61 (S2: Yes), the display controller 106 performs control to display the setting screen 62 (see FIG. 4B) in the display area of the operation display 12 (S3). In the example illustrated in FIG. 6, a case where the third button 612A for starting the invoice key setting function described above is operated as the operation button is taken as an example.

After a first key 114b is set and registered through the user operation of the setting screen 62, the generation unit 100 generates a definition file (tentative) 114A having the first key 114b recorded therein (S4).

In the example illustrated in FIG. 6, a case where 請求番号 (charge number) is recorded as the first key 114b. To discriminate a definition file being currently edited from the definition file 114 resulting from the edition, the definition file being currently edited is also referred to as the definition file (tentative) 114A.

The analysis unit 101 performs the morphological analysis of the first key 114b recorded in the definition file 114 (S5). The addition unit 103 refers to the association dictionary information 112 and adds, to the definition file (tentative) 114A, a third key 114d derived from the first key 114b and having expression fluctuation (S6).

In the example illustrated in FIG. 6, 請求書番号 (invoice number) (corresponding to Pattern 4 described above) and ご請求番号 (charge number in polite expression) (corresponding to Pattern 1) that are character strings derived from 請求番号 (charge number) and having expression fluctuation are added (see the broken-line frame in the definition file (tentative) 114A in FIG. 6).

The determination unit 102 determines whether the first key 114b and the third key 114d included in the definition file (tentative) 114A include a character recorded as Correct character in the false-recognition dictionary information 113 in the memory 11 (S7). Note that the determination unit 102 performs the above-described determination on not only the first key 114b recorded through the user operation but also the third key 114*d* (that is, a character or character string having expression fluctuation) added by the addition unit 103.

If the first key 114*b* and the third key 114*d* that are recorded in the definition file (tentative) 114A include a character recorded as Correct character (S7: Yes), the addition unit 103 further records, in the definition file (tentative) 114A, a second key 114*c* and a fourth key 114*e* that are composed in such a manner that the correct character in the first key 114*b* and the third key 114*d* is replaced with the associated falsely recognized character (S8) and completes the definition file 114 (see the broken-line frame in the definition file 114 in FIG. 6).

In the example illustrated in FIG. 6, character strings 晴求番号 (fine desire number), 晴求書番号 (fine desire document number), and ご晴求番号 (fine desire number in polite expression) are further added. Each character string is composed by replacing, with 晴 (fine), 請 (request) included in each of 請求番号 (charge number), 請求番号 (invoice number), and ご請求番号 (charge number in polite expression) that are recorded in the definition file (tentative) 114A. 請求番号 (charge number) is an example of the first key 114*b*, 請求番号 (charge number) and ご請求番号 (charge number in polite expression) are each an example of the third key 114*d*, 晴求番号 (fine desire number) is an example of the second key 114*c*, and 晴求書番号 (fine desire document number) and ご晴求番号 (fine desire number in polite expression) are each an example of the fourth key 114*e*.

(3) Operation Related to Key-Value Process

An operation for recognizing a character from the document image will be described. First, the image reading section 14 reads a document such as an invoice and generates a document image. The recognition unit 104 executes the OCR process on the document image and outputs character information indicating one or more characters included in the document image.

The extraction unit 105 searches the output character information for a key 114*a* recorded in the definition file 114 and extracts the key 114*a* and a value associated with the key 114*a* from the character information. If multiple keys 114*a* are recorded in the definition file 114, the extraction unit 105 may search for the keys 114*a* in the recording order.

The display controller 106 performs control to display the verification screen 63 having the extracted key 114*a* and the value thereof in the display area of the operation display 12. If a second key 114*c* or a fourth key 114*e* is extracted, the associated first key 114*b* (that is, a character string not including a falsely recognized character) may be displayed on the verification screen 63 instead of displaying the second key 114*c* or the fourth key 114*e* (that is, a character string including a falsely recognized character) without any change on the verification screen 63.

Second Exemplary Embodiment

A second exemplary embodiment of the present disclosure will be described with reference to FIG. 8 to FIG. 11. The second exemplary embodiment is different from the first exemplary embodiment in that a controller 10 further includes an order changing unit 107. Hereinafter, the same components as those in the first exemplary embodiment are denoted by the same reference numerals, and detailed description thereof is not provided. Description focused on the difference from the first exemplary embodiment will be provided.

Figure 8:
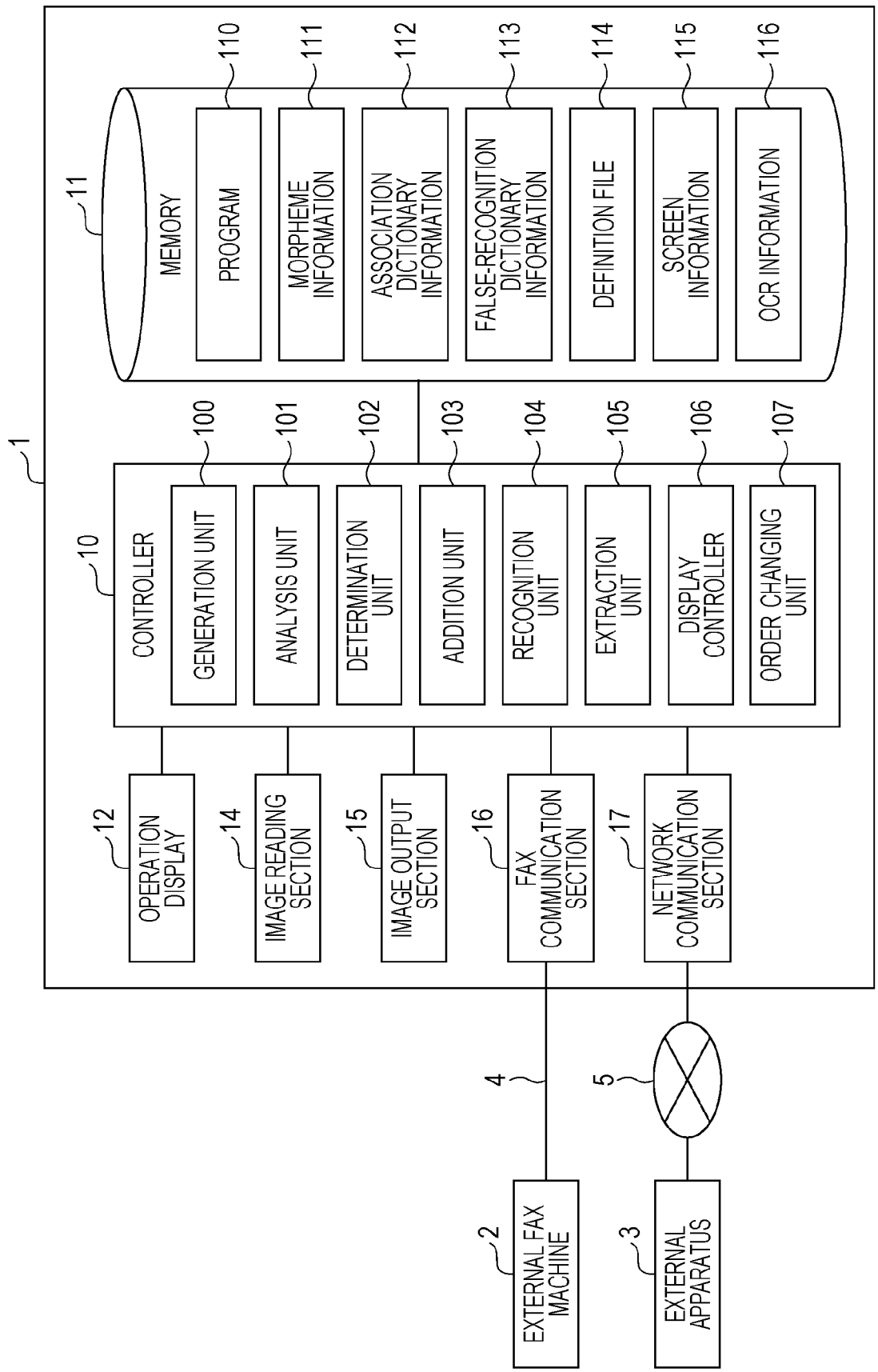
FIG. 8 is a block diagram illustrating an example control system of an information processing apparatus according to a second exemplary embodiment of the present disclosure.

FIG. 8 is a block diagram illustrating an example control system of an information processing apparatus 1 according to the second exemplary embodiment of the present disclosure. In the second exemplary embodiment as illustrated in FIG. 8, the controller 10 is further provided with the order changing unit 107 in addition to the configuration described for the first exemplary embodiment. Specifically, the CPU of the controller 10 is operated in accordance with the program 110 stored in the memory 11 and thereby further functions as the order changing unit 107 or the like in addition to the units 100 to 106 described for the first exemplary embodiment.

Figure 9A:
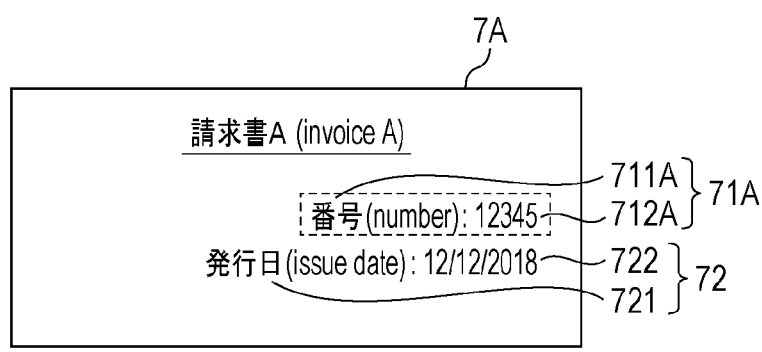
FIGS. 9A and 9B are views of example documents, the views respectively illustrating an example of a first invoice and an example of a second invoice.
Figure 9B:
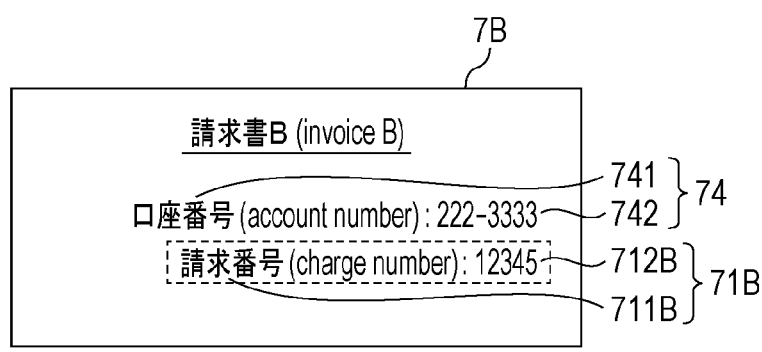

The order changing unit 107 will be described with reference to FIGS. 9 and 10. The order changing unit 107 changes the order of the keys 114*a* recorded in the definition file 114. A case where a charge number is extracted, for example, from each of the first invoice 7A as illustrated FIG. 9A and a second invoice 7B as illustrated in FIG. 9B will be described taken as an example. The first invoice 7A includes a character string 711A simply describing 番号 (number) representing a charge number, and the second invoice 7B includes a character string 711B describing 請求番号 (charge number) also representing a charge number.

In the definition file (tentative) 114A generated through a user operation, multiple keys 114*a* for extracting the information related to a charge number from the first invoice 7A and the second invoice 7B described above.

Figure 10A:
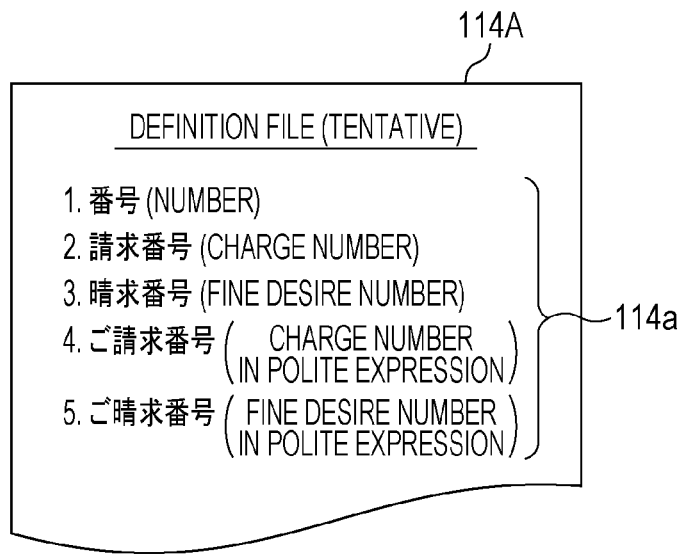
FIGS. 10A and 10B are views illustrating example definition files, the views respectively illustrating an example definition file before key order change and an example definition file after the key order change.

Specifically, not only first keys 114*b* but also a second key 114*c*, a third key 114*d*, and a fourth key 114*e* are further recorded in the definition file (tentative) 114A. As illustrated in FIG. 10A, the first keys 114*b* are respectively 番号 (number) for extracting charge number information 712A from the first invoice 7A and 請求番号 (charge number) for extracting charge number information 712B from the second invoice 7B. The second key 114*c* (specifically, 晴求番号 (fine desire number)) is composed by replacing 請 (request) in 請求番号 (charge number) with 晴 (fine). The third key 114*d* (specifically, ご請求番号 (charge number in polite expression)) is derived from 請求番号 (charge number) and has expression fluctuation. The fourth key 114*e* (specifically, ご晴求番号 (fine desire number in polite expression)) is composed by replacing 請 (request) in the third key 114*d* with 晴 (fine). Note that the numbers in FIG. 10A are conveniently provided and do not necessarily have to be described in the actual definition file 114.

The order changing unit 107 changes the order of the keys 114*a* in accordance with a predetermined criterion. The predetermined criterion includes, for example, a criterion based on the order of concepts represented by the keys 114*a*. Specifically, the order changing unit 107 may change the order of the keys 114*a* to place a key 114*a* having a concept in a superior category in a lower location of the definition file 114. Note that a concept in a superior category denotes a concept having a broader meaning including the concept of a different key 114*a*. More specifically, the order changing unit 107 may change the order of the recorded keys 114a in accordance with, for example, how many characters the keys 114a each have.

Figure 10B:
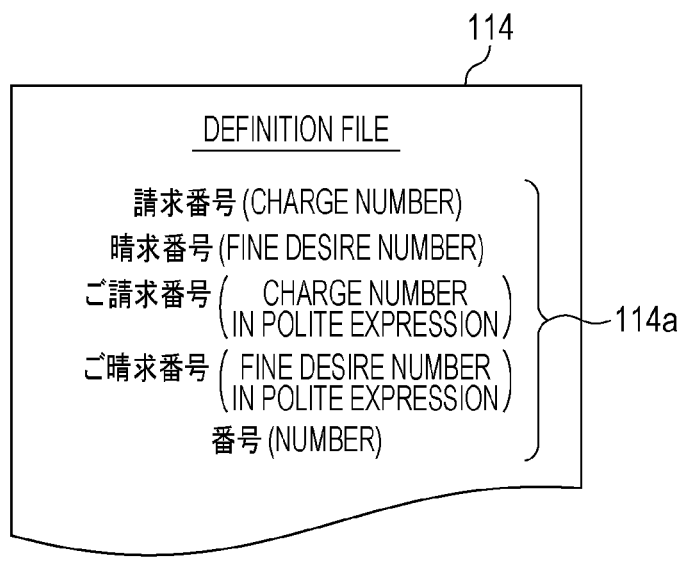

More specifically, the order changing unit 107 may change the order to record a key 114a constituted by a smaller number of characters in a lower location. For example, as illustrated in FIG. 10B, the order changing unit 107 may change the order to place 番号 (number) constituted by two characters that is the smallest number of characters in the keys 114a at the end of the file.

Exemplary Examples

FIG. 11 is a view illustrating an example of character string extraction. Suppose a case where the extraction unit 105 searches the second invoice 7B for the character strings of the keys 114a in accordance with the order of the keys 114a recorded in the definition file (tentative) 114A (see FIG. 10A) before the order of the keys 114a is changed, that is, in the order from 番号 (number), 請求番号 (charge number), 晴求番号 (fine desire number), ご請求番号 (charge number in polite expression), and ご晴求番号 (fine desire number in polite expression). In this case, as illustrated in the broken-line frame in FIG. 11, the character string 741 describing 口座番号 (account number) including the character string describing 番号 (number) and the account number information 742 indicating the value of 口座番号 (account number) are extracted.

In contrast, if the extraction unit 105 searches the second invoice 7B for the character strings in accordance with the order of the keys 114a recorded in the definition file 114 (see FIG. 10B) after the order of the keys 114a is changed, that is, from 請求番号 (charge number), 晴求番号 (fine desire number), ご晴求番号 (charge number in polite expression), ご晴求番号 (fine desire number in polite expression), and 番号 (number), the character string 711B describing 請求番号 (charge number) and the charge number information 712B indicating the value of 請求番号 (charge number) are extracted.

Even if the recording order is changed, the key 114a describing 番号 (number) is still recorded in the definition file 114. Accordingly, even if the definition file 114 is applied to the first invoice 7A, the character string 711A describing 番号 (number) and the charge number information 712A indicating the value of 請求番号 (charge number) are extracted.

Third Exemplary Embodiment

A third exemplary embodiment of the present disclosure will be described with reference to FIGS. 12 to 16. The third exemplary embodiment is different from the first exemplary embodiment in that a controller 10 further includes a recording unit 108 and a memory 11 further includes false-recognition-candidate dictionary information 117. Hereinafter, the same components as those in the first exemplary embodiment are denoted by the same reference numerals, and detailed description thereof is not provided. Description focused on the differences from the first exemplary embodiment will provided.

Figure 12:
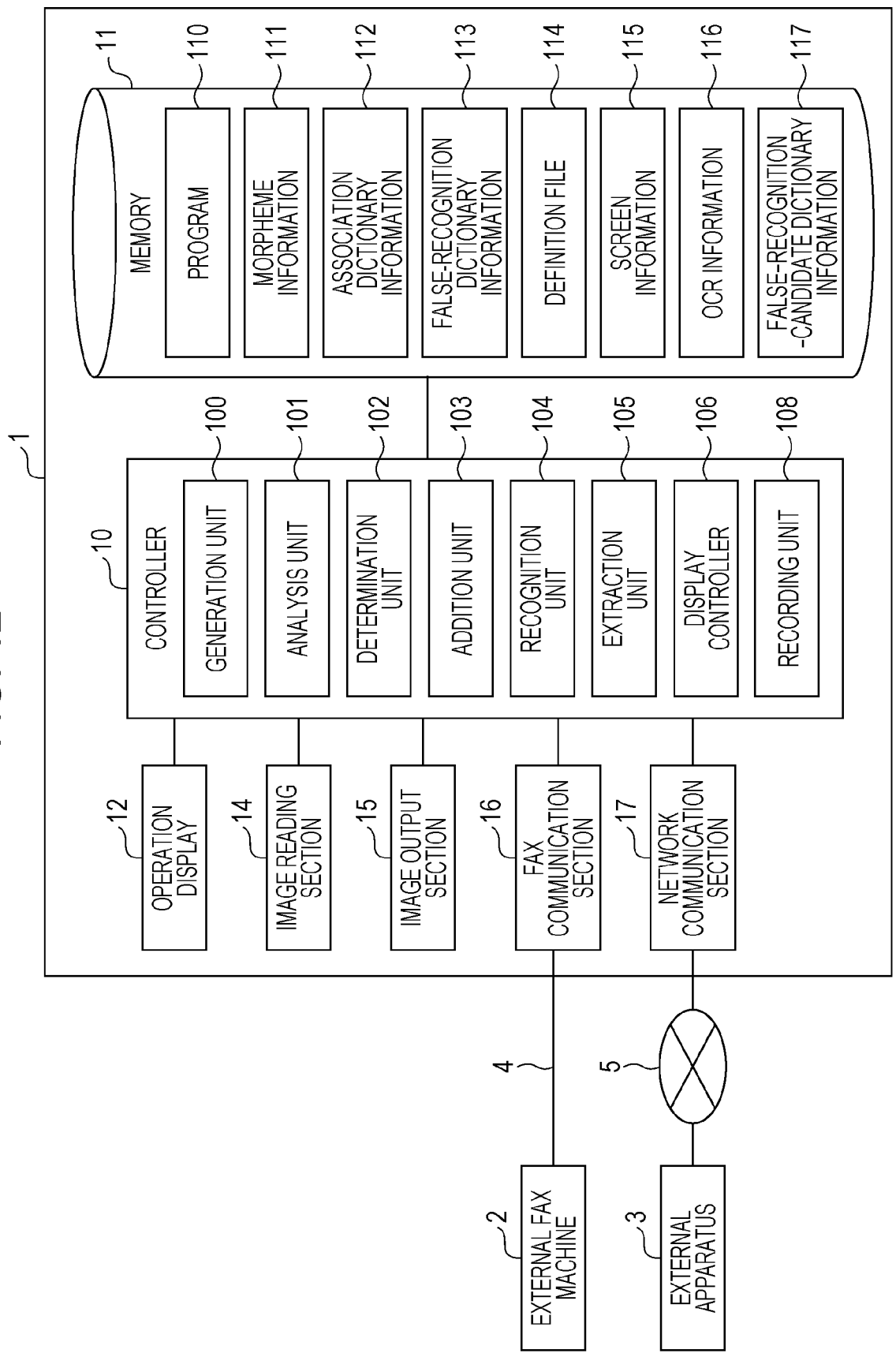
FIG. 12 is a block diagram illustrating an example control system of an information processing apparatus according to a third exemplary embodiment of the present disclosure.

FIG. 12 is a block diagram illustrating an example control system of an information processing apparatus 1 according to the third exemplary embodiment of the present disclosure. In the third exemplary embodiment as illustrated in FIG. 12, the controller 10 is further provided with the recording unit 108 in addition to the configuration described for the first exemplary embodiment. Specifically, the CPU of the controller 10 is operated in accordance with the program 110 stored in the memory 11 and thereby further functions as the recording unit 108 or the like in addition to the units 100 to 106 described for the first exemplary embodiment. The details of the recording unit 108 will be described later.

The memory 11 further stores therein the false-recognition-candidate dictionary information 117 in addition to various pieces of information according to the first exemplary embodiment. FIG. 13 is a table illustrating an example of the false-recognition-candidate dictionary information 117. As illustrated in FIG. 13, the false-recognition-candidate dictionary information 117 has a Falsely recognized character column and a Correct character column like the false-recognition dictionary information 113.

In the third exemplary embodiment, the extraction unit 105 searches character information for the keys 114a, as extraction targets, that are recorded in the definition file 114 and further at least one similar character string as a candidate for a character string falsely recognized as any of these keys 114a (hereinafter, also referred to as a candidate character string) and extracts the found character strings from the character information.

The candidate character string denotes, for example, a character string having an index taking on a value higher than or equal to a predetermined reference value. The index indicates the degree of matching with a key 114a. The index indicating the degree of matching with a key 114a applies to, for example, a percentage of the multiple characters constituting the key 114a that are included in a character string. The predetermined reference value may be, for example, 80%.

Specifically, suppose a case where a key 114a is 請求書番号 (invoice number). In this case, five characters constitute 請求書番号 (invoice number) (specifically, 請 (request), 求 (desire), 書 (document), 番 (number), and 号 (number)). A candidate character string includes a character string (such as 請水書番号 (request water document number)) including four characters (for example, 請 (request), 書 (document), 番 (number), and 号 (number)) that account for 80% of the five characters constituting 請求書番号 (invoice number).

The recording unit 108 records a character 水 (water) in the above-described example) in the Falsely recognized character column of the false-recognition-candidate dictionary information 117. The character 水 (water) is not included in the multiple characters (請 (request), 求 (desire), 書 (document), 番 (number), and 号 (number) in the above-described example) that constitute the key 114a ( 請求書番号 (invoice number) in the above-described example). The key 114a 請求書番号 (invoice number) is associated with the candidate character string ( 請水書番号 (request water document number) in the above-described example) extracted by the extraction unit 105.

The recording unit 108 also records, in the Correct character column, a character (求 (desire) in the above-described example) associated with the character (水 (water) in the above-described example) recorded as a falsely recognized character among the multiple characters constituting the key 114a. The character that is not included in the multiple characters constituting the key 114a associated with the candidate character string is an example of a third specific character.

FIGS. 14A and 14B are views illustrating example screens, that is, respectively illustrating an example candidate screen and an example of the verification screen 63. The screen information 115 further includes a candidate screen 64 in addition to the screen described for the first exemplary embodiment. The candidate screen 64 is an example of a verification unit.

As illustrated in FIG. 14A, the candidate screen 64 has a candidate-character-string display field 641 indicating a candidate character string extracted by the extraction unit 105 and a record button 642 causing the user to select whether the candidate character string is to be recognized as a character string extracted as the associated key 114a. After the record button 642 is operated, the candidate character string extracted by the extraction unit 105 (that is, a character string including a falsely recognized character) is handled as a character string extracted as the associated key 114a (that is, a character string not including a falsely recognized character).

Operation of Third Exemplary Embodiment

The operation of the third exemplary embodiment includes the following operation in addition to the operation of the first exemplary embodiment. The extraction unit 105 searches character information for not only each key 114a recorded in the definition file 114 but also a candidate character string associated with the key 114a and extracts the found character strings from the character information.

When the extraction unit 105 extracts a candidate character string, the display controller 106 performs control to display, as illustrated in FIG. 14A, the candidate screen 64 including the candidate character string in the candidate-character-string display field 641 in the display area of the operation display 12.

In response to the user operation of a registration button 642, the recording unit 108 records 水 (water) as a falsely recognized character in the false-recognition-candidate dictionary information 117 as illustrated in FIG. 13. 水 (water) is not included in the associated key 114a 請求書番号 (invoice number) and is included in the multiple characters constituting the candidate character string displayed on the candidate screen 64. The recording unit 108 also records 求 (desire) associated with 水 (water) as a correct character.

After the character included in the candidate character string is recorded in the false-recognition-candidate dictionary information 117, the display controller 106 performs control to again display the first key 114b associated with the candidate character string on the verification screen 63 in the display area of the operation display 12, as illustrated in FIG. 14B. Note that the addition unit 103 may add the candidate character string to the definition file 114.

Modification 1

Figure 15:
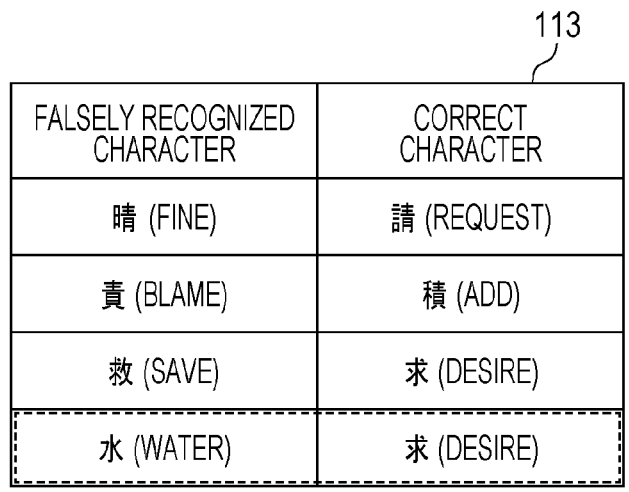
FIG. 15 is a table illustrating example false-recognition dictionary information.

FIG. 15 is a table illustrating an example of the false-recognition dictionary information 113. If a falsely recognized character included in a candidate character string and the associated correct character are recorded in the false-recognition-candidate dictionary information 117, the recording unit 108 may further record the combination of the falsely recognized character and the correct character in the false-recognition dictionary information 113. In the above-described example, as illustrated in FIG. 15, the recording unit 108 may additionally record 水 (water) and 求 (desire) in the false-recognition dictionary information 113 (see the broken-line frame in the lowest row in FIG. 15).

Modification 2

If a predetermined condition is satisfied, the recording unit 108 may further record combination of a falsely recognized character included in the candidate character string and the associated correct character in the false-recognition dictionary information 113. Specifically, the candidate character string may be used as the second key 114c to be searched for.

The predetermined condition applies to, for example, a condition related to the number of times a candidate character string is extracted by the extraction unit 105 or location information indicating the location of the candidate character string in the image. Specifically, the predetermined condition may include the following conditions.

Condition (1)

Identical characters the number of which is larger than or equal to a predetermined number of characters are recorded in respective combinations in the false-recognition-candidate dictionary information 117. The case as described above applies to, for example, a case were the extraction unit 105 extracts the same candidate character string a predetermined number of times or more. Note that the predetermined number of times and the predetermined number of characters may be, for example, 5.

Condition (2)

A candidate character string extracted by the extraction unit 105 is located in a predetermined specific range of the image. In this case, the predetermined number of times or the predetermined number of characters may be smaller than the number of times or the number of characters in Condition (1) and may be, for example, 2. The predetermined specific range may be, for example, an upper part of the image.

Figure 16:
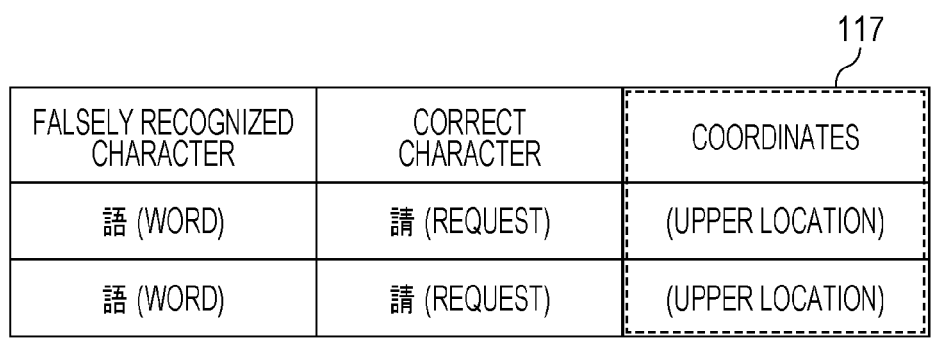
FIG. 16 is a table illustrating example false-recognition-candidate dictionary information.

This condition applies to, for example, as illustrated in FIG. 16, a case where the same candidate character string is extracted twice in an upper range as the location in the image (for example, coordinates) (see the broken-line frame in FIG. 16) as far as combination of 語 (word) as a falsely recognized character included in the candidate character string and 請 (request) as a correct character is concerned.

The exemplary embodiments of the present disclosure have heretofore been described but are not limited to the exemplary embodiments described above. Various modifications and implementations may be made without departing from the spirit of the present disclosure. For example, recording in the false-recognition dictionary information 113 is performed for each character but may be performed for each character string constituted by two or more characters.

In addition, in the operation of the first exemplary embodiment, the order of an operation for adding the third key 114d (step S6) and the order of the operations for adding the second key 114c and the fourth key 114e (steps S7 and S8) may be changed from each other. In other words, the operations for adding a new character string composed by replacing a character with a falsely recognized character may be performed, and thereafter the operation for adding a character string having expression fluctuation may be performed.

The display controller 106 does not necessarily have to display the various screens in the display area of the operation display 12 and may perform control, for example, to display the screens on the display or the like of a terminal apparatus (not illustrated) connected to the information processing apparatus 1.

The second key 114c may be composed in such a manner that if a key 114a includes two or more correct characters, each of or at least one of the two or more correct characters is replaced with a falsely recognized character. Specifically, if the first key 114b includes multiple (for example, three) correct characters 積 (add), 請 (request), and 求 (desire) like 積算額請求書 (invoice with added up amount), the second key 114c may be 責算額晴救書 (blame calculation amount fine save document) composed by replacing all of the three correct characters, may be any of 責算額晴求書 (blame calculation amount fine desire document), 責算額請救書 (blame calculation amount request save document), and 積算額晴救書 (add calculation amount fine save document) composed by replacing two of the three characters, and may be any of 責算額請求書 (blame calculation amount request desire document), 積算額晴求書 (add calculation amount fine desire document), and 積算額請救書 (add calculation amount request save document) composed by replacing one of the three correct characters. Any of these character strings may also be recorded as the second key 114c.

If a key 114a includes two or more correct characters as described above, the number of characters for replacement with a falsely recognized character may be limited. For example, the number of correct characters for replacement with a falsely recognized character may be limited to the number of characters that accounts for a predetermined percentage (for example, 50% or lower) as compared to the number of characters constituting the key 114a. For example, suppose a case where the key 114a is constituted by six characters such as 御見積請求書 (estimate and invoice in polite expression). As long as the number of characters to be replaced is smaller than or equal to 3 that is half of 6, the characters may be replaced at a time.

Part of entirety of each unit of the controller 10 may be configured by a hardware circuit such as a field programmable gate array (FPGA) or an application specific integrated circuit (ASIC).

Part of the components of each exemplary embodiment described above may be omitted or modified without departing from the spirit of the disclosure. In addition, without departing from the spirit of the disclosure, an addition, a deletion, a modification, an order change, and the like may be performed on steps in the flow of the processing in the exemplary embodiment. A program used in the exemplary embodiment may be provided in such a manner as to be recorded in a recording medium such as a compact disk read only memory (CD-ROM). The program may be stored in an external server such as a cloud server and may be used through a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory that stores a first specific character and a second specific character in association with each other; and
a processor, configured to:
perform recognition of one or more characters included in an image and outputs character information indicating the one or more characters, wherein the first specific character having an index taking on a value lower than a predetermined value, the index indicating accuracy of the recognition, the second specific character being output after the recognition of the first specific character is performed;
register at least one character or at least one character string as an extraction target, wherein the processor registers a first character or a first character string as an extraction target and a second character or a second character string as an extraction target if an operator performs an operation for registering the first character or the first character string as the extraction target and if the first character or the first character string includes the first specific character, the second character or the second character string being composed by replacing the first specific character in the first character or the first character string with the second specific character; and
extract at least one character or at least one character string from the character information, wherein the processor extracts the first character or the first character string and the second character or the second character string that are registered as the respective extraction targets.

2. The information processing apparatus according to claim 1,
wherein the processor further additionally registers a third character or a third character string as an extraction target, the third character or the third character string having meaning identical to meaning of the first character or the first character string and having an expression different from an expression of the first character or the first character string.

3. The information processing apparatus according to claim 2,
wherein the processor further additionally registers a fourth character or a fourth character string as an extraction target if the third character or the third character string includes the first specific character, the fourth character or the fourth character string being composed by replacing the first specific character in the third character or the third character string with the second specific character.

4. The information processing apparatus according to claim 3, wherein the processor is further configured to;
change order of a plurality of the characters or a plurality of the character strings if the plurality of the characters or the plurality of the character strings are registered as a plurality of the extraction targets.

5. The information processing apparatus according to claim 4,
wherein the processor changes the order in accordance with how many characters the plurality of the characters or the plurality of the character strings each have.

6. The information processing apparatus according to claim 3, wherein the processor is further configured to:
perform control if a degree of matching of a character or a character string extracted from the character information with a character or a character string registered as an extraction target takes on a value higher than or equal to a predetermined value, the control being performed to display a value associated with the extracted character or the extracted character string.

7. The information processing apparatus according to claim 2, wherein the processor is further configured to:
change order of a plurality of the characters or a plurality of the character strings if the plurality of the characters or the plurality of the character strings are registered as a plurality of the extraction targets.

8. The information processing apparatus according to claim 7,
wherein the processor changes the order in accordance with how many characters the plurality of the characters or the plurality of the character strings each have.

9. The information processing apparatus according to claim 2, wherein the processor is further configured to:
perform control if a degree of matching of a character or a character string extracted from the character information with a character or a character string registered as an extraction target takes on a value higher than or equal to a predetermined value, the control being performed to display a value associated with the extracted character or the extracted character string.

10. The information processing apparatus according to claim 1, wherein the processor is further configured to:
change order of a plurality of the characters or a plurality of the character strings if the plurality of the characters or the plurality of the character strings are registered as a plurality of the extraction targets.

11. The information processing apparatus according to claim 10,
wherein the processor changes the order in accordance with how many characters the plurality of the characters or the plurality of the character strings each have.

12. The information processing apparatus according to claim 11, wherein the processor is further configured to:
perform control if a degree of matching of a character or a character string extracted from the character information with a character or a character string registered as an extraction target takes on a value higher than or equal to a predetermined value, the control being performed to display a value associated with the extracted character or the extracted character string.

13. The information processing apparatus according to claim 10, wherein the processor is further configured to:
perform control if a degree of matching of a character or a character string extracted from the character information with a character or a character string registered as an extraction target takes on a value higher than or equal to a predetermined value, the control being performed to display a value associated with the extracted character or the extracted character string.

14. The information processing apparatus according to claim 1, wherein the processor is further configured to:
perform control if a degree of matching of a character or a character string extracted from the character information with a character or a character string registered as an extraction target takes on a value higher than or equal to a predetermined value, the control being performed to display a value associated with the extracted character or the extracted character string.

15. The information processing apparatus according to claim 14, wherein the processor is further configured to:
temporarily record a third specific character as the second specific character if the degree is higher than or equal to a predetermined threshold, the third specific character not being included in the registered character or the registered character string and being included in the extracted character or the extracted character string.

16. The information processing apparatus according to claim 15,
wherein the third specific character includes third specific characters that are identical, and if the third specific characters the number of which is larger than or equal to a predetermined number are recorded, the memory stores the third specific character as the second specific character and further stores the first specific character associated with the third specific character in association with the second specific character.

17. The information processing apparatus according to claim 16,
wherein in a case where the predetermined number is a first number,
if a location of the extracted character or the extracted character string in the image is within a predetermined range, and if the third specific characters the number of which is larger than or equal to a second number that is smaller than the first number are recorded, the memory further stores the third specific character as the second specific character in association with the first specific character associated with the third specific character.

18. An information processing apparatus comprising:
a memory that stores a first specific character and a second specific character in association with each other; and
a processor, configured to:
perform recognition of one or more characters included in an image and outputs character information indicating the one or more characters, wherein the first specific character having an index taking on a value lower than a predetermined value, the index indicating accuracy of the recognition, the second specific character being output after the recognition of the first specific character is performed;
register a first character or a first character string as a target for extraction from the character information;
add a second character or a second character string as a target for extraction if the first character or the first character string includes the first specific character, the second character or the second character string being composed by replacing the first specific character in the first character or the first character string with the second specific character; and
extract the first character or the first character string and the second character or the second character string from the character information.

19. A non-transitory computer readable medium storing a program causing a computer to execute a process comprising:
performing recognition of one or more characters included in an image and outputting character information indicating the one or more characters;

storing a first specific character and a second specific character in association with each other, the first specific character having an index taking on a value lower than a predetermined value, the index indicating accuracy of the recognition performed in the performing of the recognition, the second specific character being output after the performing of the recognition of the first specific character;

registering a first character or a first character string as an extraction target and a second character or a second character string as an extraction target if an operator performs an operation for registering the first character or the first character string as the extraction target and if the first character or the first character string includes the first specific character, the second character or the second character string being composed by replacing the first specific character in the first character or the first character string with the second specific character; and extracting, from the character information, the first character or the first character string and the second character or the second character string that are registered as the respective extraction targets.

\* \* \* \* \*